United States Patent [19]
Boddy

[11] Patent Number: 5,769,577
[45] Date of Patent: Jun. 23, 1998

[54] REMOVABLE SPINNING TOOL ASSEMBLY

[75] Inventor: Lawrence O. Boddy, 4541 Oakwood Dr., Westminster, Colo. 80030

[73] Assignee: Lawrence O. Boddy, Westminster, Colo.

[21] Appl. No.: 278,012

[22] Filed: Jul. 20, 1994

[51] Int. Cl.$^6$ ................................................ B23B 51/00
[52] U.S. Cl. ...................... 408/231; 408/197; 408/239 R
[58] Field of Search ..................................... 408/181, 185, 408/231, 232, 238, 239 R, 240, 197; 279/89, 141

[56] References Cited

U.S. PATENT DOCUMENTS

| | | |
|---|---|---|
| 2,323,010 | 6/1943 | Conradson . |
| 3,289,273 | 12/1966 | Astaud ..................................... 408/239 |
| 3,521,507 | 7/1970 | Yogus et al. ............................. 408/239 |
| 3,726,001 | 4/1973 | Anderson et al. . |
| 3,785,228 | 1/1974 | Clagett et al. . |
| 3,821,844 | 7/1974 | Harman et al. . |
| 3,859,699 | 1/1975 | Lindskog ................................. 408/143 |
| 4,176,991 | 12/1979 | Egli ......................................... 408/238 |
| 4,547,103 | 10/1985 | Pape ..................................... 408/239 R |
| 4,656,898 | 4/1987 | Hunt et al. . |
| 4,723,878 | 2/1988 | Kelm et al. . |
| 4,822,220 | 4/1989 | Danielsson et al. ................ 408/239 R |
| 5,092,206 | 3/1992 | Ronzoni . |
| 5,167,478 | 12/1992 | Ramunas ............................. 408/239 R |

FOREIGN PATENT DOCUMENTS

| | | | |
|---|---|---|---|
| 1627012 | 8/1978 | Germany ............................... 408/181 |
| 635705 | 3/1962 | Italy ...................................... 408/238 |

OTHER PUBLICATIONS

Rapi–Change Tooling Systems by W.A. Whitney Co., Rockford, Illinois MAN–Feb. 1994.
Disclosure Document #355188.

*Primary Examiner*—Daniel W. Howell
*Attorney, Agent, or Firm*—Rick Martin

[57] ABSTRACT

An improvement to the art of interchangeable spinning machine tool holders has a horizontal disengagement mechanism. A dove tail assembly is used on a spinning receiver and a drilling tool holder combination. In operation a drill press can remain in position above a workpiece. Then the dove tail can be loosened and the drilling tool holder exchanged with another. When the dove tail is tightened the new drilling tool holder is in the proper machining position.

9 Claims, 4 Drawing Sheets

REMOVABLE SPINNING TOOL ASSEMBLY

FIELD OF INVENTION

The present invention relates to interchangeable spinning machine tools which mount on a drill press and the like.

BACKGROUND OF THE INVENTION

It is known in the machine tool arts to provide an assembly of like tools which can be quickly mounted/dismounted from a lathe or drill press and the like. The idea is to save the machinist time while he switches the cutting tools necessary to complete his project. A brief summary of the relevant prior art follows below.

U.S. Pat. No. 2,323,010 (1943) to Conradson discloses a multiple tool carrier for use on the platform of a lathe and the like. The tool carrier does not spin. A dovetail assembly holds the circular tool carrier.

U.S. Pat. No. 3,726,001 (1973) to Anderson et al. discloses a boring mill quick change tool assembly.

U.S. Pat. No. 3,785,228 (1974) to Clagett et al. discloses a removable quick change cutting tool holder for use on the platform of a lathe. A dovetail assembly secures the tool holder.

U.S. Pat. No. 3,821,844 (1974) to Harman et al. discloses a sliding tool holder for a lathe.

U.S. Pat. No. 4,656,898 (1987) to Hunt et al. discloses a portable lathe device used for facing large flange faces on pipe in the field.

U.S. Pat. No. 4,723,878 (1988) to Kelm et al. discloses a releasable tool clamp having a cylindrical member and an eccentric slot.

U.S. Pat. No. 5,092,206 (1992) to Ronzoni discloses a non-rotating tool holder for a lathe. A dovetail assembly secures the tool holder.

RAPI-CHANGE® Tooling Systems by W.A. Whitney Co., Rockford, Ill. discloses a quick change tool system for a spinning drill. The drill must be raised at least the height of the mounting shaft of the drilling tool holder above the work piece before affecting a change. The locking means is a screw type collar. This is the closest prior art known to the present inventor.

The Whitney device does allow rapid tool changes. However, as seen in FIGS. 1, 2 the drilling tool holder 4 has a mounting shaft 40 which is locked into a spinning receiver 3. In order to mount/dismount the drilling tool holder 4, the spinning drive shaft 2 must be retracted away from the workpiece 6 at least the distance of the mounting shaft 40, D3. Thus, the original working distance, D1, from the workpiece 6 to the drilling tool holder 4 must be modified in order to accommodate the vertical disengagement of the mounting shaft 40. In order to resume work, the distance D1 must be re-established. It should be noted that drill bit 5 has a mounting shaft 50 which is held inside the drilling tool holder 4 in a conventional manner.

The re-establishment of distance D1 causes two problems. First the re-extension of drive shaft 2 out of body 1 could be off by a few thousandths of an inch, thus destroying accuracy. Also the tip of drill bit 5 and the replacement tool could be jostled a few thousandths of an inch from its original position 7 on the workpiece 6. This is especially true when the drive shaft 2 is moved to the side away from the workpiece in order to get the needed vertical clearance. Finally, time is lost retracting the spinning drive shaft 2 and re-checking all the precise positioning parameters before starting the next machine operation.

The present invention eliminates these problems by providing a horizontal disengagement means for the drilling tool holder. A dove tail locking assembly allows the drilling tool holder to be removed from the spinning receiver while the spinning receiver is in the stopped position precisely above the workpiece at the desired position. Thus, the operator can save time replacing the drilling tool holder and minimize recalibration efforts.

SUMMARY OF THE INVENTION

The main object of the present invention is to provide a horizontal disengagement means for a removable spinning receiver.

Another object of the present invention is to provide a dove tail locking assembly for the horizontal disengagement means.

Another object of the present invention is to provide an adjustable centering mechanism on the drilling tool holder to accommodate wear or allow off center rotation when desired.

Other objects of this invention will appear from the following description and appended claims, reference being had to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
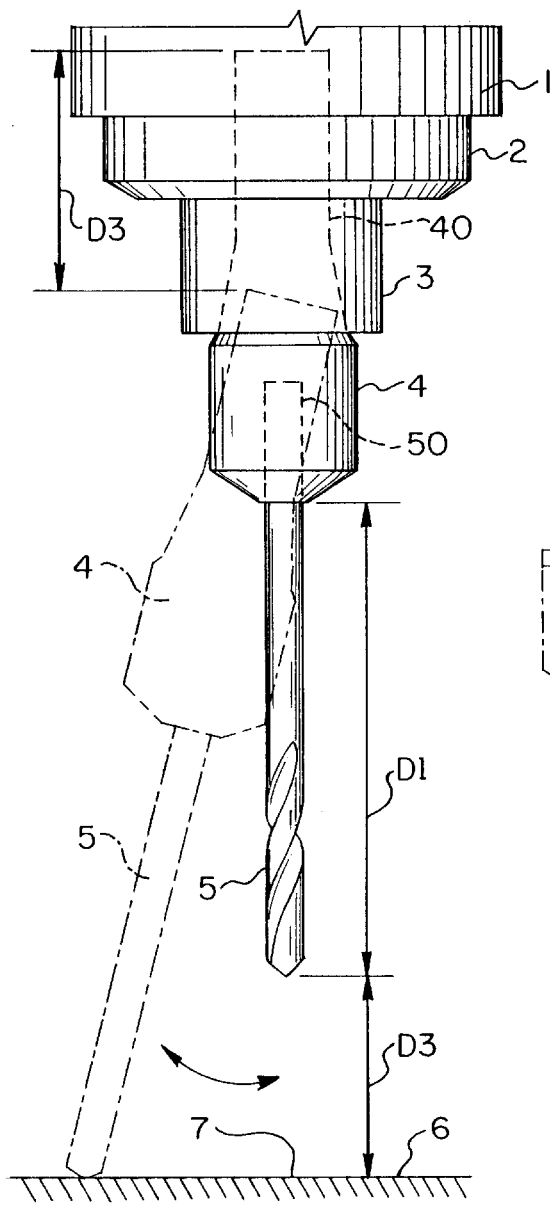
FIG. 1 (prior art) is a front plan view of a conventional quick change tooling system.

Referring first to FIG. 1 the spinning drive shaft 2 has been retracted into body 1 so as to raise the drilling tool holder 4 a distance D3 above the working distance D1.

Figure 3:
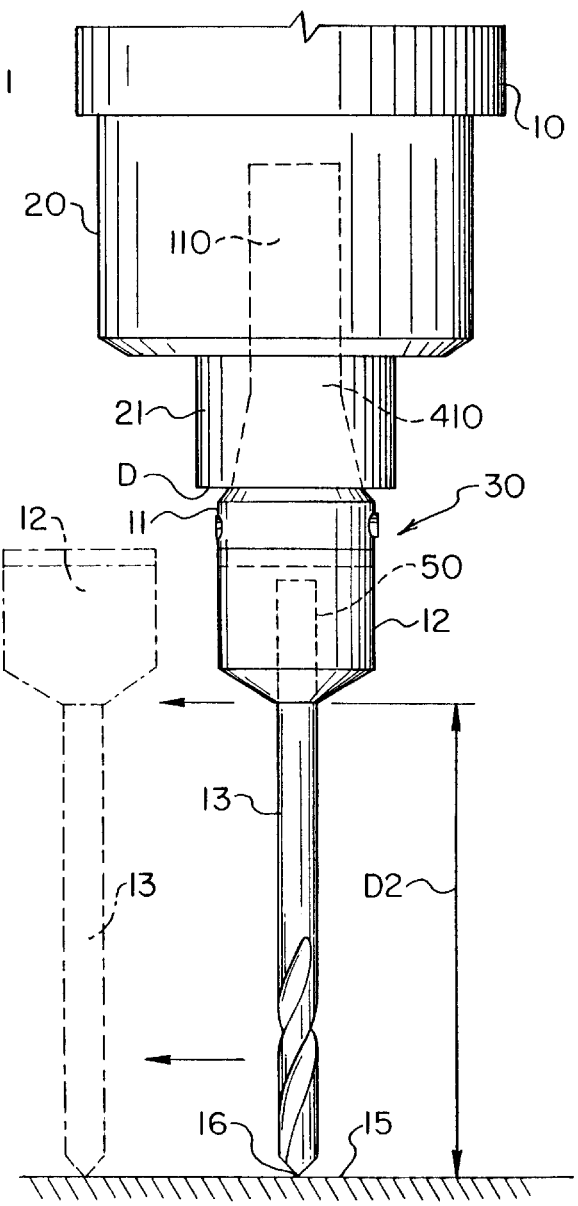
FIG. 3 is a front plan view of the present invention installed on a drill press.
Figure 2:
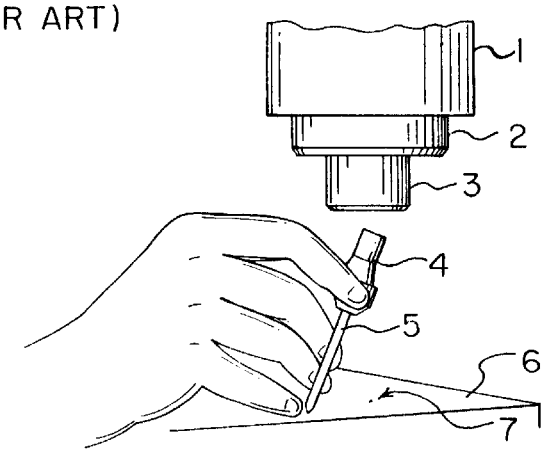
FIG. 2 (prior art) is a perspective view of the quick change tooling system of FIG. 1 having the machinist removing the interchangeable drilling tool holder.

In FIG. 3 the working distance D2 of the preferred embodiment does not change. A removable spinning tool assembly 30 consists of drilling tool holder 11 which is mounted in the shank 21 of retractable spinning drive shaft 20. A body 10 holds the spinning drive shaft 20 which has an axis of rotation A. Spinning receiver 11 has a mounting shaft 110 which is secured inside shank 21. Spinning receiver 11 is affixed to the distal end D. of shank 21. Quickly removable from spinning receiver 11 is drilling tool holder 12. A drill bit 13 is secured inside drilling tool holder 12 in a known manner.

A work piece 15 is being machined at point 16 while the working distance D2 is set. The dotted drilling tool holder 12 and drill bit 13 is shown horizontally removed from spinning receiver 11.

Figure 4:
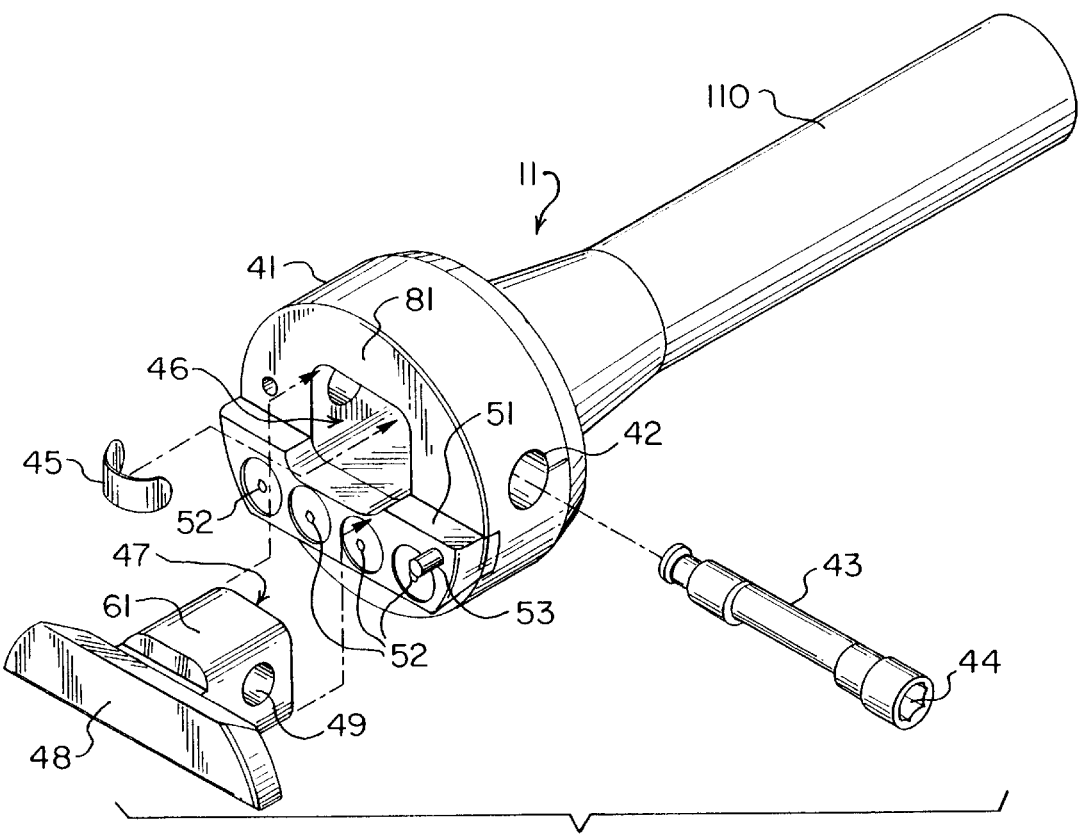
FIG. 4 is a top perspective exploded view of the spinning receiver of FIG. 3.
Figure 5:
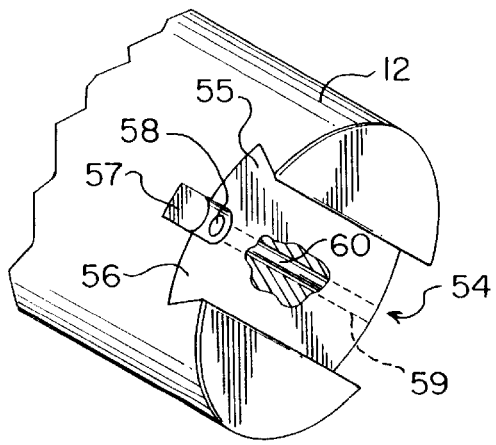
FIG. 5 is a top perspective view of the drilling tool holder of FIG. 3.
Figure 6:
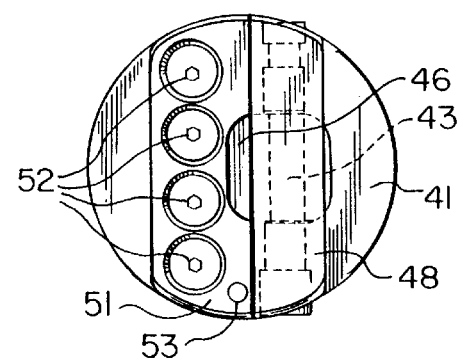
FIG. 6 is a bottom plan view of the spinning receiver of FIG. 4.

Referring next to FIGS. 4, 6 the spinning receiver 11 is shown in detail. The mounting shaft 110 and mounting head 41 are preferably machined from a single piece of metal. A mounting shaft 46 houses the shank 61 of movable dove tail member 48. A spring 45 seats against the bottom of shaft 46 and pushes against the base 47 of shank 61. A cam shaft 43 holds the movable dove tail member 48 in place via holes 42, 49. Rotating the cam shaft 43 by means of fitting 44 causes the movable dove tail member 48 to move toward the mounting head 41 and lock into grooves 55, 56 of slot 54 in the drilling tool holder 12 (FIG. 5).

The stationary dove tail member 51 is held in place by bolts 52. Thus, both dove tail members 48, 51 can be readily removed and machined to repair damage due to wear and tear. An alignment stud 53 protrudes from the stationary dove tail member 51. The alignment stud 53 fits into notch 57 of the drilling tool holder 12 as best seen in FIG. 5. An adjustment bolt 60 has a tip 58 upon which the alignment stud 53 rests. Normally the drilling tool holder 12 is centered by these means. However, the hole 59 allows the adjustment bolt 60 to be moved either to account for wear and tear or to provide intentional off-center machining.

Figure 7:
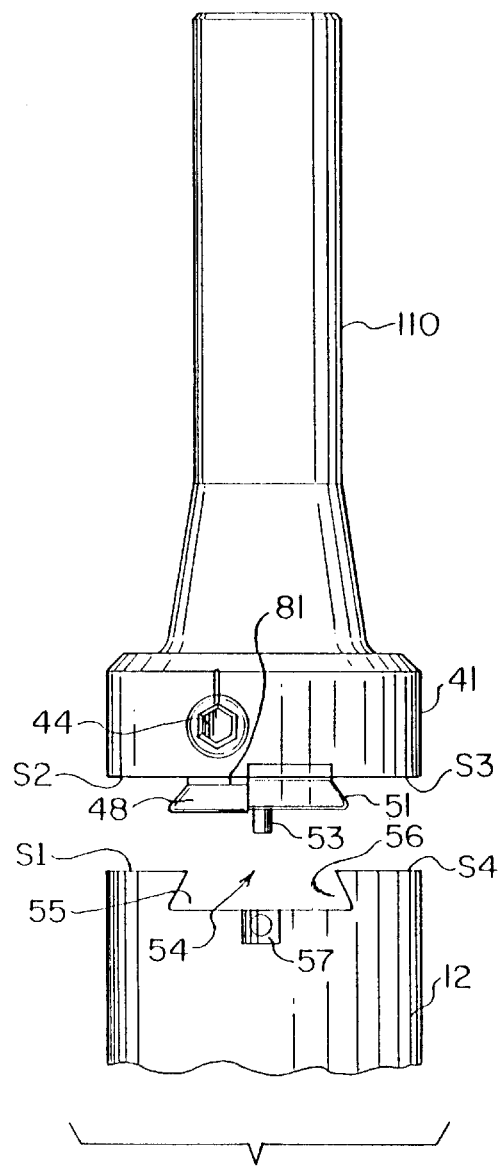
FIG. 7 is a side plan view of the spinning receiver of FIG. 3 uncoupled from the drilling tool holder.
Figure 8:
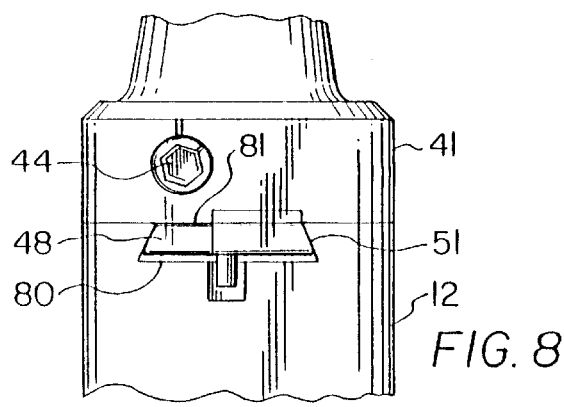
FIG. 8 is a close up side plan view of the dove tail assembly installed in FIG. 3.

Referring next to FIGS. 7, 8 the movable dove tail member 48 is seen in the open position in FIG. 7. After the drilling tool holder 12 is slidingly engaged with the mounting head 41, the fitting 44 is tightened thereby locking the movable dove tail member 48 against the grooves 55, 56 of the drilling tool holder 12. A gap 80 is formed in the locked position. A gap 81 is formed in the open position as best seen in FIG. 7. The mating surfaces Sl/S2 and S3/S4 provide structural rigidity in the locked position.

Figure 9:
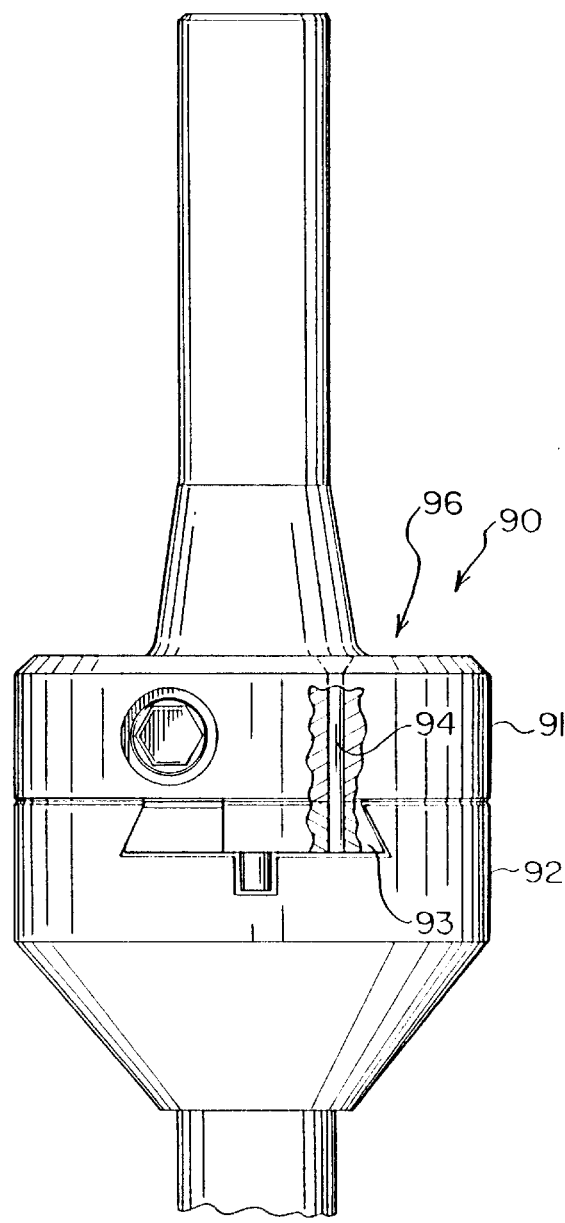
FIG. 9 is a front plan view with a partial cutaway of a larger alternate embodiment of the present invention.

Referring next to FIG. 9 a larger alternate embodiment is shown designated as interchangeable assembly 90. A spinning receiver 91 supports a drilling tool holder 92 in the same fashion as the preferred embodiment of FIGS. 3–8. However, the spinning receiver 91 has an upper ledge 96 which allows retaining bolts 94 to be mounted there through. Stationary dove tail member 93 is secured to the spinning receiver 91 by bolts 94.

Figure 10:
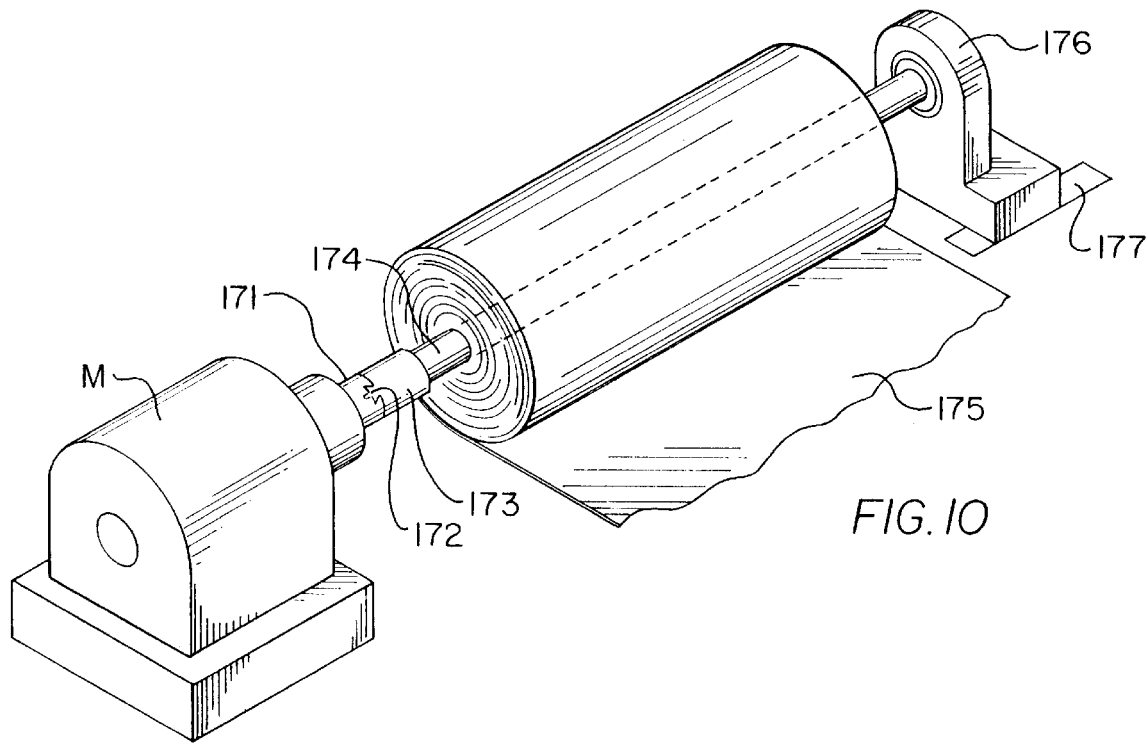
FIG. 10 is a top perspective view of a roller embodiment of the present invention.

Referring next to FIG. 10 a roller application of the present invention is shown. A motor M turns a drive shaft 171 which in turn turns an axle 174 which carries sheet film 175. Axle 174 is supported distally from motor M by sliding support 176. To exchange axle 174 the sliding support 176 is pulled away from motor M on track 177. Then the dove tail assembly 172 is loosened allowing the axle mount 173 and axle 174 to be removed.

Figure 11:
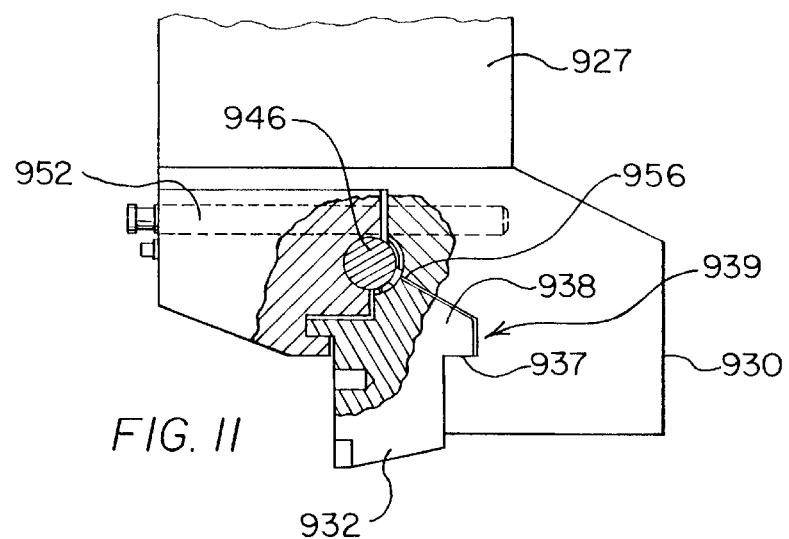
FIG. 11 is a side plan view with a cutaway of an alternate embodiment of a dove tail type mounting means.

Referring last to FIG. 11 an alternate embodiment of a dove tail assembly is shown.

A drive shaft 927 spins a receiver 930. A drilling tool holder 932 is supported in a cavity 939 by means of a tongue 938 resting on a ledge 937. For tightening, the rotary pin bar 946 is rotated by the rack bar 952. This in turn rotates key 956 against the tongue 938, thereby locking it into position.

Although the present invention has been described with reference to preferred embodiments, numerous modifications and variations can be made and still the result will come within the scope of the invention. No limitation with respect to the specific embodiments disclosed herein is intended or should be inferred.

I claim:

1. An interchangeable spinning tool assembly comprising:
  a spinning drive shaft having an axis of rotation and a distal end;
  a spinning receiver having a horizontal surface and affixed to the spinning drive shaft at the distal end;
  a machining tool holder;
  means for removably connecting the machining tool holder to the spinning receiver perpendicular to the axis of rotation, functioning to enable the removal of the machining tool holder without moving it distally from the distal end;
  said means for removably connecting the machining tool holder to the spinning receiver further comprising a dovetail assembly;
  said dove tail assembly further comprising a movably dovetail member and a stationary dovetail member mounted on the spinning receiver, and a matching slot on the machining tool holder functioning to secure both dovetail members; and
  said movable dovetail member being movable in a direction perpendicular to the horizontal surface of the spinning receiver, thereby selfcentering the machining tool holder.

2. An interchangeable spinning tool assembly, comprising:
  a retractable spinning drive shaft having an axis of rotation;
  a spinning receiver having a horizontal surface and affixed to the retractable spinning drive shaft;
  a machining tool holder;
  means for removably connecting the machining tool holder cross axially to the axis of rotation, functioning to allow removal without retracting the retractable spinning drive shaft;
  said means for removably connecting the machining tool holder further comprising a dovetail assembly; said dovetail assembly further comprising a moveable dovetail member and a stationary dovetail member mounted on the spinning receiver, and a matching slot on the machining tool holder functioning to secure both dovetail members; and
  said movable dovetail member being movable in a direction perpendicular to said horizontal surface of the spinning receiver, thereby functioning to self-center the machining tool holder.

3. The assembly of claim 2 wherein said means for removably connecting further comprise a tongue and locking pin assembly.

4. The assembly of claim 1, wherein said movable dovetail member and said stationary dovetail member each further comprise a removable fastening means functioning to removably attach each stationary dovetail member and movable dovetail member to the spinning receiver.

5. The assembly of claim 4 wherein said removable fastening means further comprise bolts.

6. The assembly of claim 5, wherein said stationary dove tail member further comprises an alignment stud, and the machining tool holder further comprises a concave notch which engages the alignment stud functioning to center the machining tool holder.

7. The assembly of claim 6, wherein said notch further comprises an adjustment bolt functioning to radially adjust the machining tool holder when the adjustment bolt engages the alignment stud.

8. The assembly of claim 4 further comprising a cam shaft functioning to move the moveable dove tail member.

9. The assembly of claim 1 wherein said spinning drive shaft is retractable.

\* \* \* \* \*